(12) United States Patent
Leland et al.

(10) Patent No.: US 10,839,173 B2
(45) Date of Patent: Nov. 17, 2020

(54) RFID MOTION TRIGGERING

(71) Applicant: INTERMEC, INC., Lynnwood, WA (US)

(72) Inventors: Hunter Leland, Cedar Rapids, IA (US); Gary Spiess, Lisbon, IA (US); John Jorgenson, Cedar Rapids, IA (US); Rene Martinez, Seattle, WA (US)

(73) Assignee: INTERMEC, INC., Lynnwood, WA (US)

( * ) Notice: Subject to any disclaimer, the term of this patent is extended or adjusted under 35 U.S.C. 154(b) by 366 days.

(21) Appl. No.: 15/807,799

(22) Filed: Nov. 9, 2017

(65) Prior Publication Data
US 2019/0138768 A1 May 9, 2019

(51) Int. Cl.
*G06K 7/10* (2006.01)
(52) U.S. Cl.
CPC ...... *G06K 7/10316* (2013.01); *G06K 7/10118* (2013.01); *G06K 7/10128* (2013.01); *G06K 7/10217* (2013.01)
(58) Field of Classification Search
None
See application file for complete search history.

(56) References Cited

U.S. PATENT DOCUMENTS

| 7,113,087 | B1 | 9/2006 | Casebolt et al. | |
|---|---|---|---|---|
| 7,825,775 | B2 | 11/2010 | Strat et al. | |
| 2010/0045435 | A1* | 2/2010 | Duron | G06K 7/0008 340/10.1 |
| 2011/0064165 | A1* | 3/2011 | Bae | H04L 25/061 375/319 |
| 2011/0210824 | A1* | 9/2011 | Stewart | H01Q 1/2216 340/10.1 |
| 2012/0231734 | A1 | 9/2012 | Symons et al. | |
| 2014/0281534 | A1* | 9/2014 | McCormack | H04L 63/0428 713/168 |
| 2016/0234005 | A1* | 8/2016 | Hong | H04B 15/00 |

FOREIGN PATENT DOCUMENTS

GB 2341504 A 3/2000

* cited by examiner

*Primary Examiner* — Thien M Le
*Assistant Examiner* — Asifa Habib
(74) *Attorney, Agent, or Firm* — Alston & Bird LLP

(57) ABSTRACT

A RFID reader RFID reader may include an antenna that outputs signals and receive signals reflected from an object moving relative to the antenna, and circuitry configured to receive the reflected signals from the antenna. The reflected signals may determine that the motion has occurred relative to the antenna or be cancelled using a signal generated based on the reflected signals.

20 Claims, 17 Drawing Sheets

*RFID SYSTEM COMMUNICATION*

RFID MOTION TRIGGERING

BACKGROUND

Radio Frequency Identification ("RFID") reader are used for reading RFID tags. However, RFID readers detect low frequency oscillations caused by objects that move in front of the antenna, which changes the antenna impedance causing inefficient reading of tags and unwanted noise in the RFID reader.

Current RFID readers simply monitor the effect that changes in antenna impedance have on the coupled energy by using either a RF envelope detector or vector demodulator. With this approach, however, large impedance changes of the antenna result in larger reflected power that could saturate the detection circuitry.

SUMMARY

Embodiments of the present application provide an RFID reader which allows for changing the complex impedance at the coupler isolation port and can be changed by a microcontroller in order to reduce the amount of power that is reflected back into the receiver. The proposed method tracks the changes in complex impedance required to minimize the reflected power instead of directly sampling the changes in the reflected energy.

In one embodiment, an RFID reader RFID reader may include an antenna that outputs signals and receive signals reflected from an object moving relative to the antenna, and circuitry configured to receive the reflected signals from the antenna. The reflected signals may determine that the motion has occurred relative to the antenna or be cancelled using a signal generated based on the reflected signals.

In one aspect, an RFID reader may include a radio frequency (RF) circuitry, an antenna, a transmission pathway connecting the antenna with the RF circuitry, a coupler and a controller. The coupler may have a main line in electrical communication with the transmission pathway, and a coupled line configured to sample signals received from the antenna, the sampled signals including low frequency oscillations caused presence or movement of an object or body portion relative to the antenna. The controller may be configured to output, using a signal generator, a cancellation signal, which is an inverse of the low frequency oscillations, to the coupler such that the cancellation signal from the controller is configured to cancel, at the main line, the low frequency oscillations received from the antenna.

In another aspect, an RFID reader may include a radio frequency (RF) signal source providing RF signals, a transmission pathway connected to the RF source, an antenna connected to the transmission pathway, a coupler, and a controller. The coupler may have a main line in electrical communication with the transmission pathway and a coupled line, the coupled line configured to sample signals received from the antenna including low frequency oscillations caused by the presence of an object or body portion relative to the antenna. The controller may be configured to output, using the RF signal source, a signal to the coupled line based on the low frequency oscillations such that the signal from the controller is configured to cancel, at the main line, at least a portion of the low frequency oscillations received from the antenna.

In another aspect, an RFID reader may include an antenna that outputs signals and receive signals reflected from an object moving relative to the antenna; and circuitry configured to receive the reflected signals from the antenna and determine that the motion has occurred relative to the antenna in response to detecting low frequency oscillations in the received reflected signals.

BRIEF DESCRIPTION OF THE DRAWINGS

Examples of a RFID Motion Triggering are illustrated in the figures. The examples and figures are illustrative rather than limiting.

DETAILED DESCRIPTION OF THE EMBODIMENTS

Figure 1:
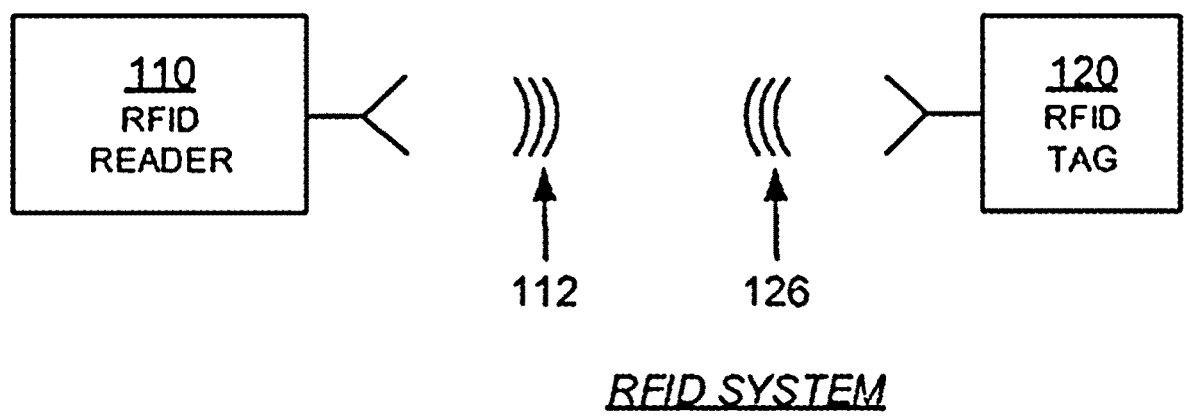
FIG. 1 is a block diagram of components of an RFID system according to embodiments.

Described below are example configurations of the present invention, any of which configuration can be used alone or in any combination.

Overview

Many RFID readers are equipped with antenna tuning circuits, sometimes called "auto-tuning", that are designed to compensate for the changes in impedance of the antenna over the frequency band of operation and for impedance changes caused by changes in the environment. The impedance of the antenna also changes with motion as object enter and leave the electromagnetic field. Tuning the antenna at a periodic rate and processing the tuning changes over time provides information about objects moving in the RF field.

This motion information could be used to provide advanced RFID reader features to differentiate RFID devices. Some advanced features include a low-power motion detection mode that triggers RFID operations when objects enter the field, lowering the output power of a handheld reader when it is set down, gestures such as tapping the antenna or placing an object, like a plastic container, over the antenna to initiate the RFID operation.

The present application is directed to detecting motion by detecting the complex impedance of the RFID antenna (or other antenna) and also directed to cancelling any reflections which are caused by the motion.

Generally speaking, typically fixed RFID systems incorporate external general purpose inputs and outputs that are connected to external sensors that trigger when the RFID operations occur in order to save power and provide more contextual information. For RFID portal installations, separate RF or optical sensors are used to initiate the RFID operation when a tagged object passes through the portal. This reduces the amount of data that are collected by the RFID system and hopefully reads all of the tags of interest without reading tags located in the near vicinity. As the RFID technology matures and tags and readers become more and more sensitive there is an increasing problem reading undesired tags that may not be passing by the antenna, but located near it. By only triggering the RFID read when tags of interest are moving by the antenna the amount of superfluous information can be reduced.

This invention removes the need for an external motion detector or presence sensor. The RFID reader itself can function in a low power detection mode when there are not tagged objects moving in front of the antenna without an external sensor. Another benefit of this method is that the detection mode can function with output power considerably lower than what is needed for an RFID operation. This is beneficial not only in the power savings of the reader, i.e. transmitting 10 mW instead of 1000 mW, but also in preventing battery assisted passive (BAP) tags from being continually energized and commanded to respond which will decrease battery life.

For a typical RFID parking access application in which a fixed RFID reader is reading battery assisted passive electronic vehicle registration tag, the RFID reader can continually tune the antenna monitoring for changes at a low output power, i.e. 10 mW. Once a vehicle approaches the antenna the change of impedance is detected and the RFID reader can increase the transmit power and perform a RFID operation on the tag and open the gate. Limiting the high output power of the RFID reader to only instances when a tagged object is present will prevent the battery assisted passive tags in the near vicinity, i.e. parked in the garage near the gated entrance, from waking up and attempting to communicate to the reader which probably doesn't have the sensitivity to hear them.

For typical in-transit asset visibility (ITAV) application in which the RFID reader and antennas are mounted in the back of a van carrying high value asset that need to be carefully tracked it is desirable to know when the assets are loaded onto or removed from the vehicle. There is also a desire to have the system as transparent to the vehicle operator as possible to prevent tampering and to allow the operator to perform their job without having to do extra work in order to trigger or manage the RFID system. Ideally the RFID system would be triggered only when the doors to the vehicle are opened to track asset movement. It is difficult to connect wired sensors to the vehicle doors due to variations in vehicles and the robustness, ruggedness of the sensor. With this detection capability the RFID reader could detect when the doors are opened/closed by the impedance change inside the vehicle. Since very low power is required to detect impedance changes the RFID system will not waste vehicle system power performing reads when the group of assets are not changing.

Generally speaking, some RFID readers include an auto tuning circuit that is used to compensate for the changes in the antenna impedance across the frequency band of operation and also changes in antenna impedance caused by changes in the environment. As objects move in front of the antenna the antenna impedance changes and the auto tuning circuit adjusts to minimize the reflected power from the antenna. Collecting and processing the tuning circuit controls over time as the tuning circuit compensates for the changes in the environment produces knowledge of objects moving in the environment or presence of objects in front of the antenna. Motion information can be derived from the periodic sampling and processing of the adjustments the tuning circuit must make to account for changes in the environment Various embodiments are discussed in more depth below in combination with the drawings. Below is a description of RFID technology (with reference to FIGS. 1-5) and motion detection and cancellation of reflections caused by motion (with reference to FIGS. 6-21).

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1," if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
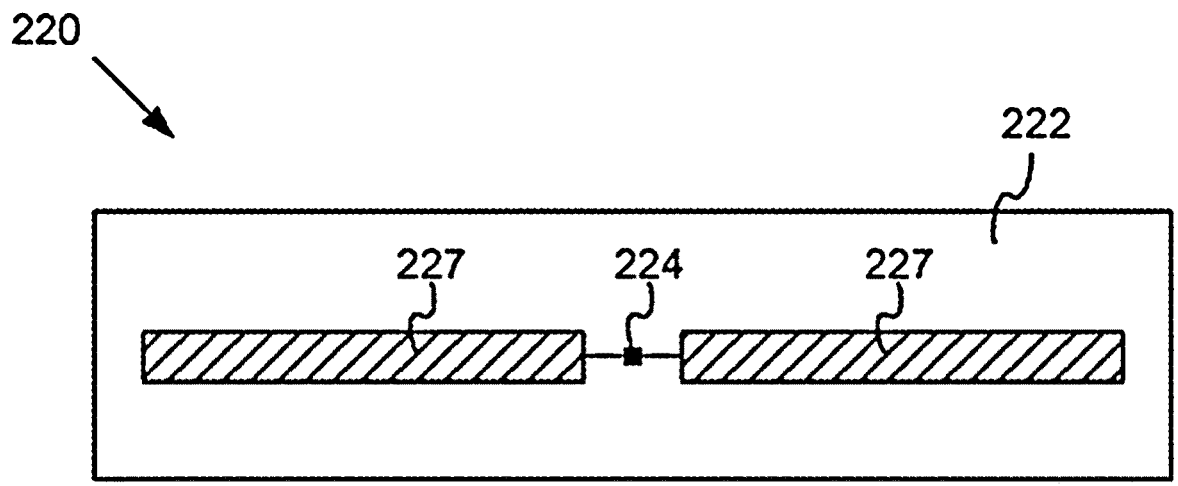
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which may be implemented as an integrated circuit (IC) 224. IC 224 is arranged on printed circuit board (PCB) 222.

Tag 220 also includes an antenna for exchanging wireless signals with its environment. The antenna may be flat (e.g., a microstrip) and attached to PCB 222. IC 224 is electrically coupled to the antenna via suitable antenna terminals (not shown in FIG. 2).

IC 224 is shown with a single antenna port, comprising two antenna terminals coupled to two antenna segments 227 which are shown here forming a dipole. Many other embodiments are possible using any number of ports, terminals, antennas, and/or segments of antennas.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on.

The components of the RFID system of FIG. 1 may communicate with each other in any number of modes. One such mode is called full duplex. Another such mode is called half-duplex, and is described below.

Figure 3:
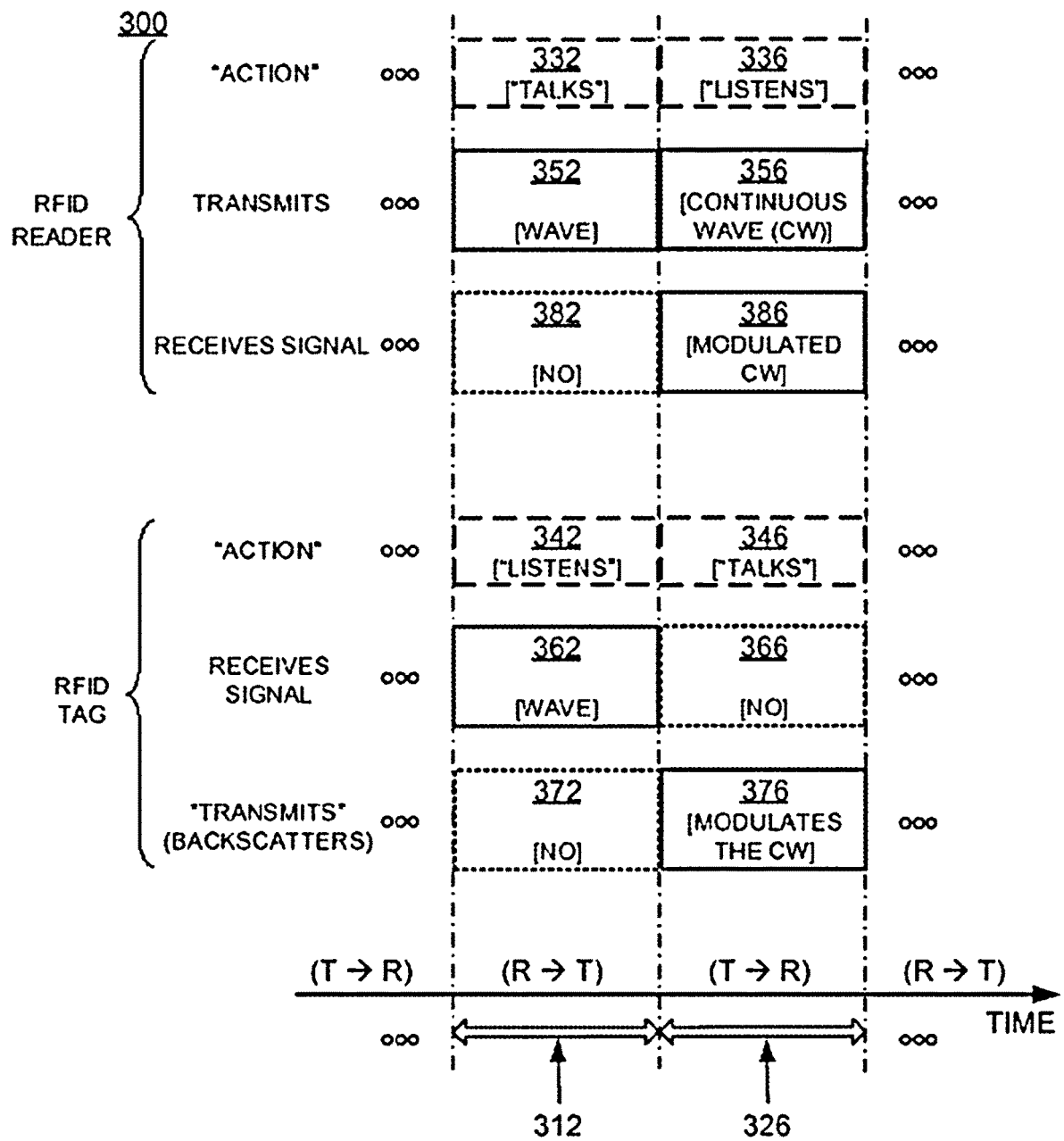
FIG. 3 is a diagram of RFID communication between an RFID reader and RFID tag.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of technical behavior, during interval 312, reader 110 talks to tag 120 as follows. According to block 352, reader 110 transmits modulated wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
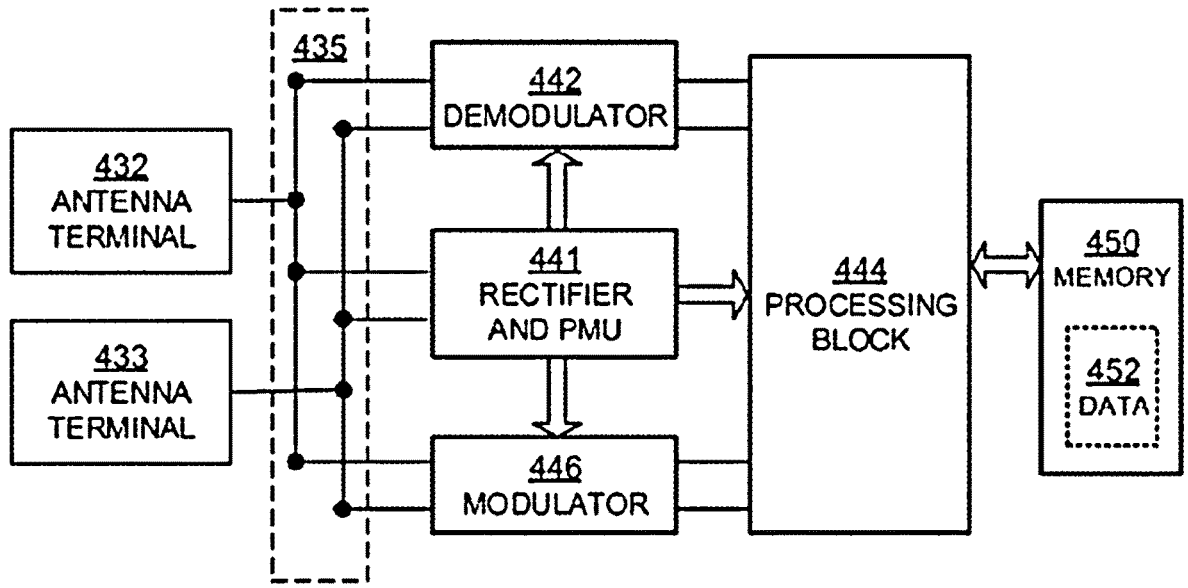
FIG. 4 is a diagram showing some components for making an RFID tag according to embodiments.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 shows two antenna terminals 432, 433, which are suitable for coupling to antenna segments such as segments 227 of RFID tag 220 of FIG. 2. When two antenna terminals form a signal path with an antenna they are often referred-to as an antenna port. Antenna terminals 432, 433 may be made in any suitable way, such as using pads and so on. In many embodiments more than two antenna terminals are used, especially when more than one antenna port or more than one antenna is used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF power received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
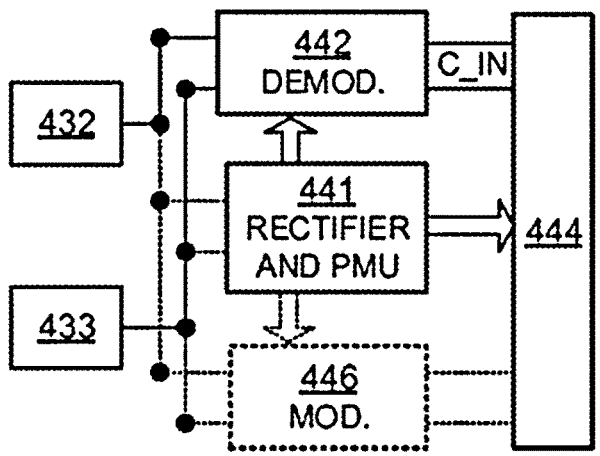
FIG. 5A is a diagram for showing a basic relationship of how the components of FIG. 4A can be arranged, according to an embodiment.

FIG. 5A shows version 524-A of components of circuit 424 of FIG. 4, further modified to emphasize a signal operation during a R→T session (receive mode of operation) during time interval 312 of FIG. 3. An RF wave is received from antenna terminals 432, 433, and then a signal is demodulated from demodulator 442, and then input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
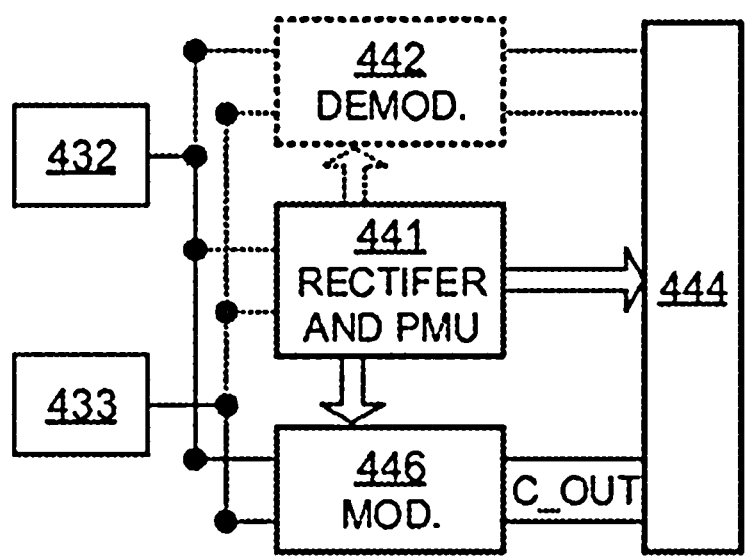
FIG. 5B is a diagram for showing a basic relationship of how the components of FIG. 4A can be arranged, according to an embodiment.

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a transmission stream of symbols. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

In embodiments, readers and tags can be operable according to a protocol, such as Version 1.2.0 of the Class-1 Generation-2 UHF RFID Protocol for Communications at 860 MHz-960 MHz ("Gen2") by EPCglobal, Inc., which is hereby incorporated by reference.

Figure 6:
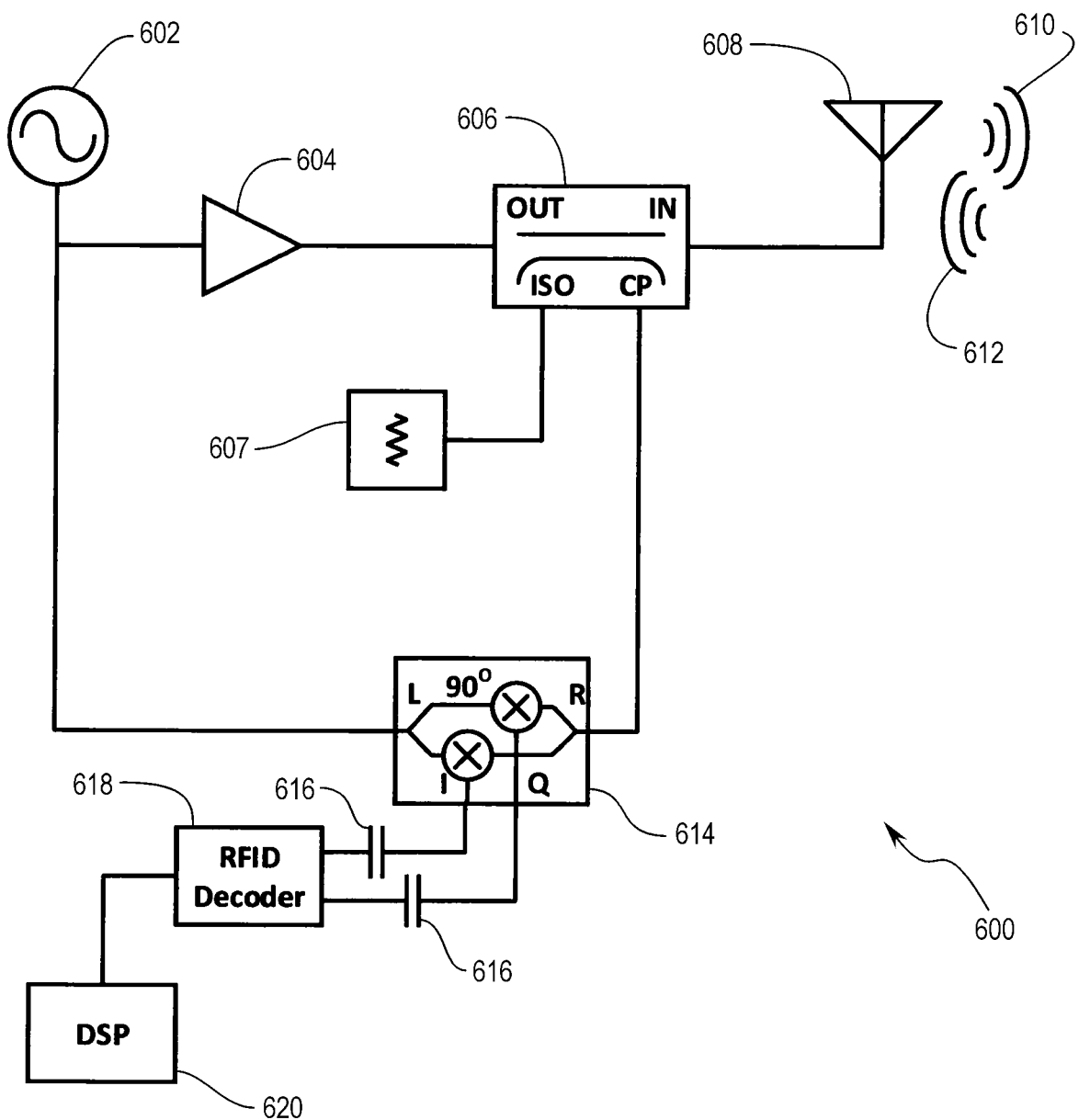
FIG. 6 is a system diagram of an RFID reader, according to a conventional embodiment.

FIGS. 6-9 illustrate features of an RFID reader according to various embodiments. FIG. 6 illustrates a system 600 of an RFID reader arrangement in a conventional arrangement when the reader is illuminating the tag with CW signal 356 and decoding the tag response 376. The system 600 may include RF circuitry, a four port directional coupler 606, an antenna 608 for communicating with a tag, a signal generator 602 that creates an RF signal, a vector demodulator 614, discrete components (e.g., capacitors 616, amplifier 604, etc.), an RFID decoder 618, and a digital signal processor ("DSP") 620.

The signal is optionally modulated by the reader, not shown in FIG. 6, and then the signal is boosted by power amplifier 604. The boosted RF signal enters into the four port directional coupler 606. A portion of the boosted RF signal is coupled into the isolated port, ISO of coupler 606, and is terminated by resistive load 607. Most of the boosted signal continues to an antenna 608 for radiation as signals 610 transmitted wirelessly from the RFID reader, shown in FIG. 6.

The antenna 608 also receives signals reflected after the signals have been transmitted by the RFID reader. These reflected RF signals 612 may be created by tags, by stationary objects, or by moving objects. Whatever the case, the reflected RF signals 612 are collected by the antenna 608. A portion of the reflected RF signals 612, received through antenna 608, are coupled into the coupled port ("CP") port of coupler 606, and then enter vector demodulator 614, which then output I and Q, shown in FIG. 6. The I and Q outputs of demodulator 614 represent the in-phase and quadrature phase, respectively, of the reflected RF signal 612.

Capacitors 616 represent a filtering operation to separate the desired reflected signals created by tags from the reflected signals created by stationary or moving objects. In general, the desired reflected signals from tags occur at a much higher frequency than reflected signals created by stationary or moving objects, which create low frequency oscillations in the reflected signals 612. Accordingly, the signals filtered by the capacitors 616 filter out the high frequency signals so that the remaining signals are in-phase and quadrature phase signals of the low frequency oscillations which are caused by the presence or movement of one or more objects relative to the antenna 608.

After capacitors 616 filter the tag signals from reflected signals generated by objects, RFID decoder 618 decodes the tag signal by itself or in combination with Digital Signal Processor (DSP) 620. Instructions in the DSP 620 track the components of the reflected signal to determine motion as discussed later.

Tracking of Low Frequency Oscillations

Figure 9:
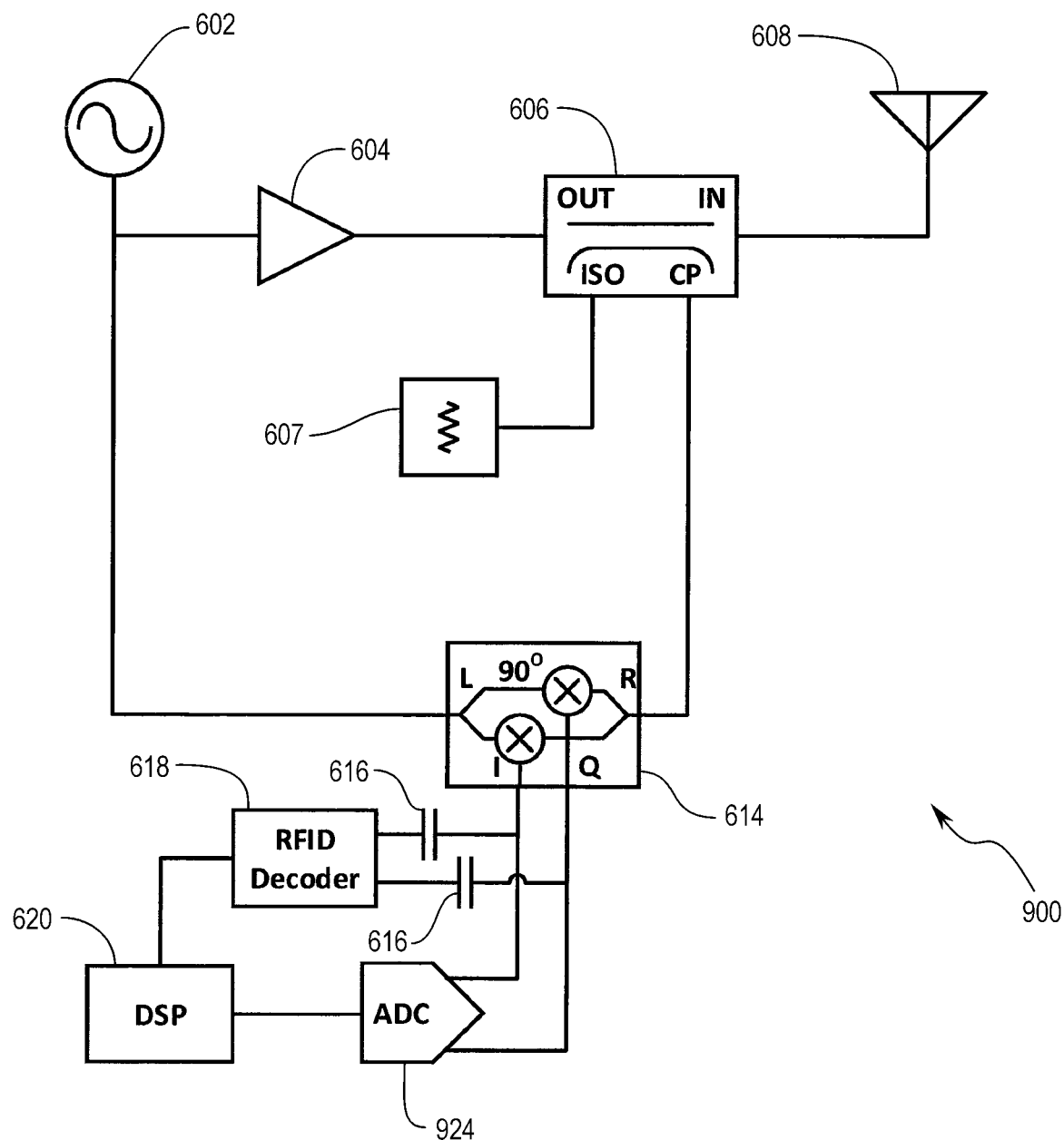
FIG. 9 is a system diagram of circuitry of an RFID reader that tracks object motion by measuring low frequency reflected signals, according to an embodiment.
Figure 10A:
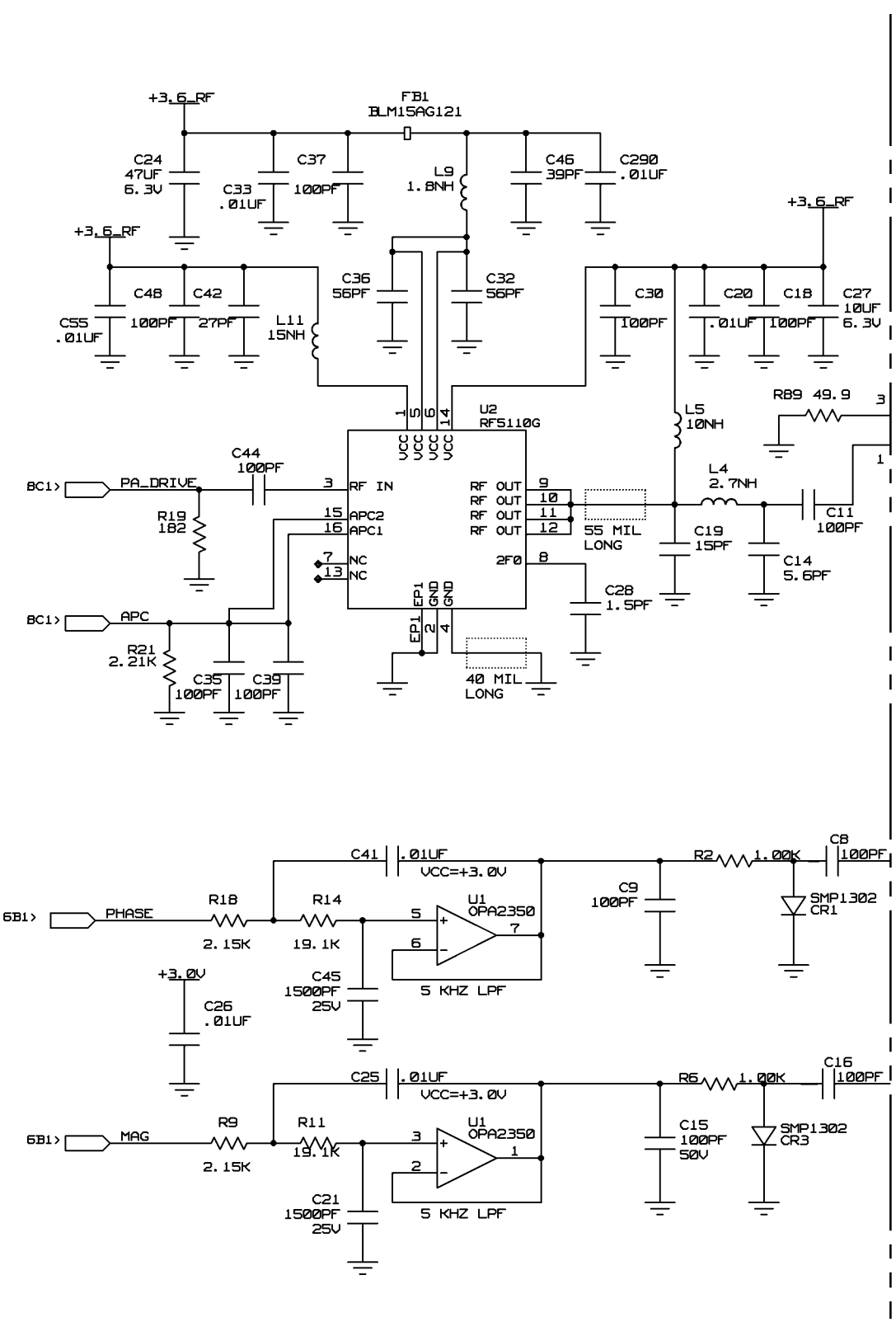
FIGS. 10A, 10B, and 10C (collectively FIG. 10) illustrate a system diagram of circuitry of an RFID reader that tracks object motion by tracking and canceling low frequency reflected signals using a dual channel ADC and varactors, according to an embodiment.
Figure 10B:
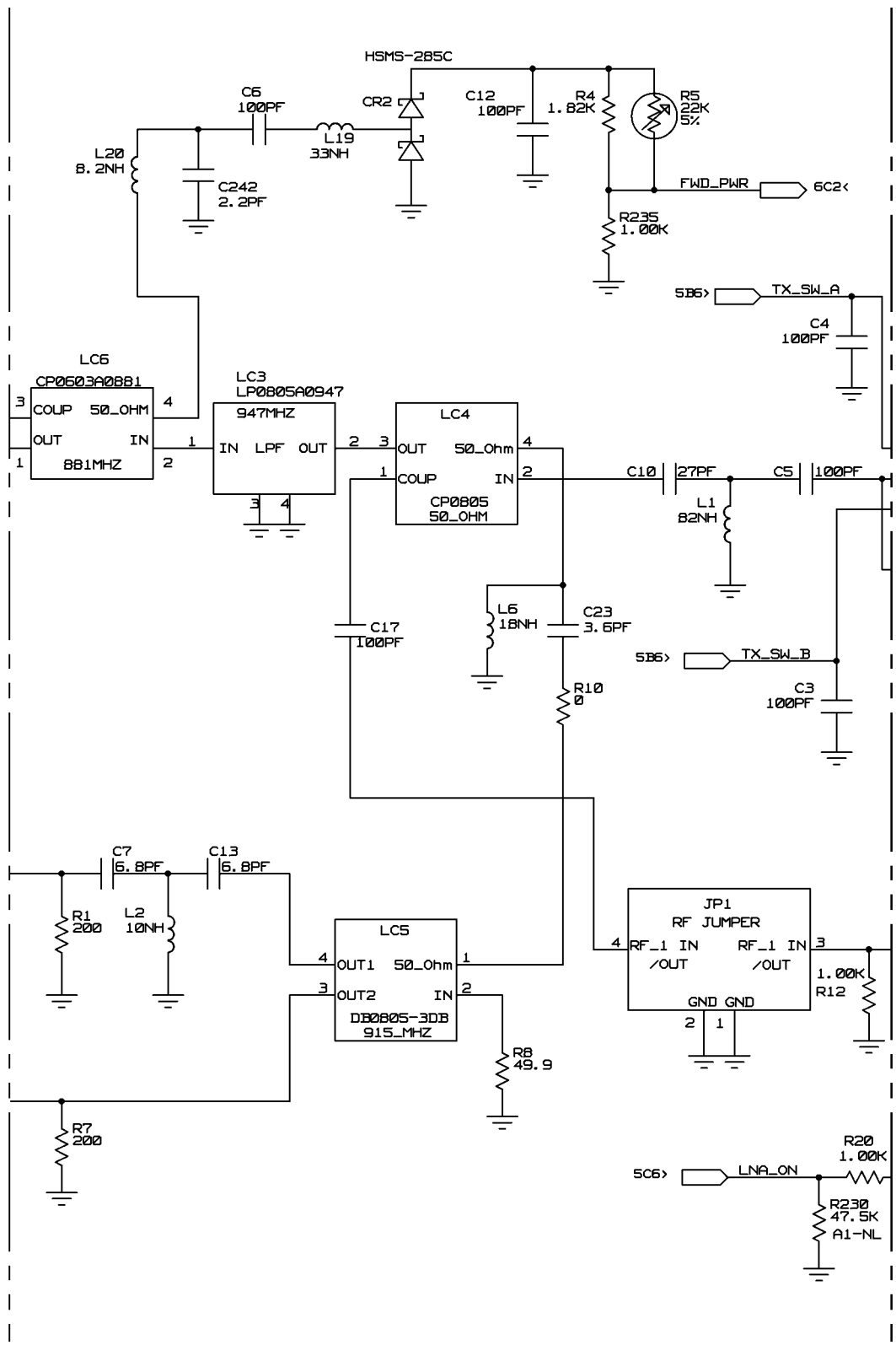
Figure 10C:
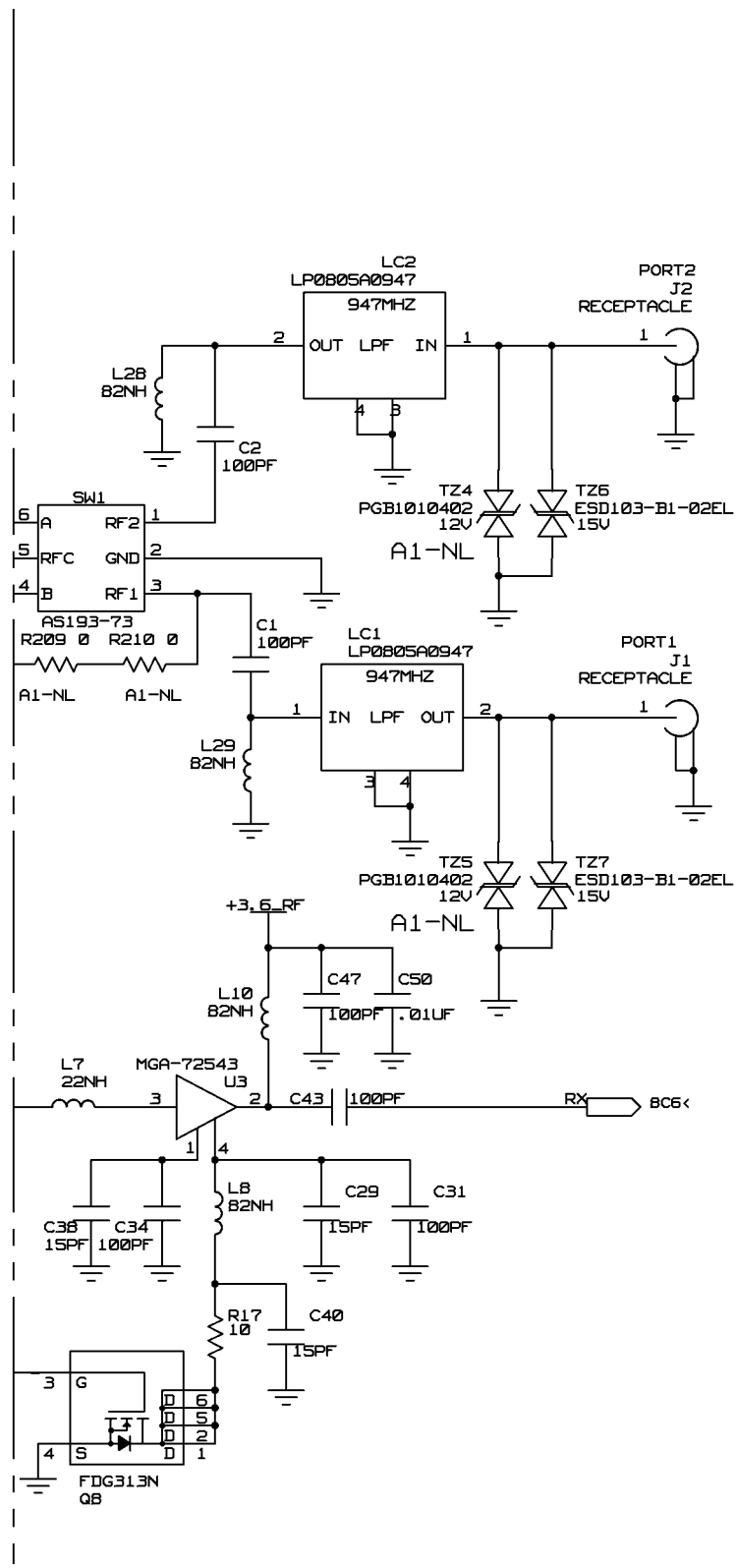

The system in FIG. 9 shows an RFID reader modified to track reflections from a moving object and is similar to FIG. 6, but with the addition of a dual channel ADC 924 that is connected to the low frequency I and Q outputs of vector demodulator 614. In operation, the reflected RF signals created by moving objects enters the R port of vector demodulator 614, and dual channel ADC 924 has a low frequency or DC connection to the I and Q outputs of vector demodulator 614. ADC 924 provides a digital representation of the in-phase and quadrature-phase components of the reflected signal into DSP 610. Instructions in the DSP 620 track the components of the reflected signal to determine motion as discussed later.

The antenna 608 may also be viewed as a transmission line with a known or measurable base impedance (e.g., a characteristic impedance). When the antenna 608 operates free of interference such as proximity to an object, an impedance of the antenna 608 may remain unchanged (e.g., the impedance is approximately equal to the base impedance). However, if the antenna is interrupted (e.g., by bringing the object into contact with, or within close proximity to, the antenna 608), the impedance may change.

Cancellation and Tracking of Low Frequency Oscillations

Figure 7:
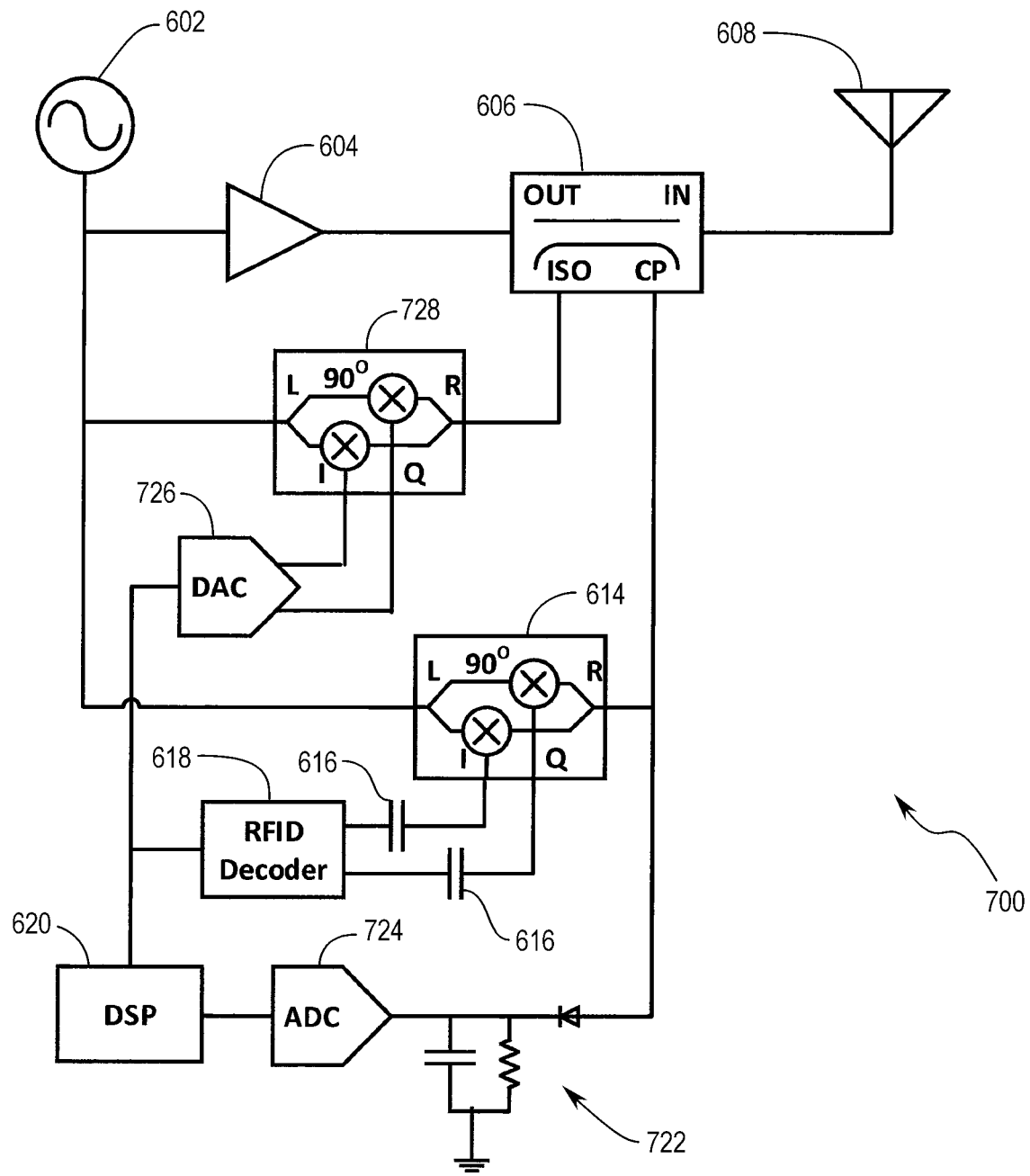
FIG. 7 is a system diagram of circuitry of an RFID reader that tracks object motion by tracking and canceling low frequency reflected signals using a power detector, according to an embodiment.

FIG. 7 illustrates a system with a different configuration from FIG. 6 to cancel signals caused by motion proximate to the antenna, and the systems tracks the changes in complex impedance required to minimize the reflected power. The antenna 608 of FIG. 7 may be an antenna which communicates over radio frequency to communicate with RFID tags within range of the antenna. The antenna may be the antenna for an RFID reader or be a component of a separate device/circuit. FIG. 7 is similar to the system 600 but with additional components comprising of envelope detector 722, analog-to-digital converter (ADC) 724, digital-to-analog converter (DAC) 726. The resistive load 607 of FIG. 6 connected to the isolated port of coupler 606 is replaced by vector modulator 728 in FIG. 7.

In operation, envelope detector 722 samples the power of the reflected signal back from the antenna 608. The envelope detector 722 includes a diode, resistor, and capacitor. The amount of reflected power detected by the envelope detector 722 is converted to digital value by ADC 724, and the digital value of the reflected power enters into DSP 620. Additional instructions in DSP 620 create digital cancelation values. These DSP instructions generate an inverse of the low frequency output signals received by the ADC. These signals may be referred to a "compensation signals," "negative cancellation signals" or "cancellation signals." DSP 620 outputs digital cancelation values to DAC 726, and DAC 726 creates two analog voltages that are converted to an RF cancelation signal using vector modulator 728. The RF cancelation signal enters coupler 606 of FIG. 7 via the isolated port, combines in the coupler 606, and then cancels the RF reflected signal emerging from the coupled (CP) port of coupler 606. In this embodiment, the envelope detector 722, ADC 724, instructions in DSP 620, DAC 726, and vector modulator 728 operate in a feedback loop to minimize or eliminate the reflected signals from moving or stationary objects. The cancellation feedback loop operates at a lower frequency compared to high frequency signals generated by the tag, and the cancelation feedback can operate in the presence or absence of tags. The high frequency output from vector demodulator 614 relates to frequencies communicated by the tag responses, and the low frequency output relates to low frequency oscillation signals caused by motion in proximity of the antenna. These low frequency oscillation signals correspond to the Doppler frequency of the moving object (for example, a frequency 2.44 Hz for an object moving at 0.4 m/s with a carrier frequency of 915 MHz), which may be similar to DC voltage. The high frequency signals correspond to the RFID tag modulation, which may be a frequency above 1 kHz. Note components in FIG. 7 could be replaced by functional equivalents. For example, vector modulator 728 could be replaced by two varactors to create a canceling RF signal as in FIG. 10. As an additional example, directional coupler 606 can be replaced by circulators, splitters, isolators, or a combination thereof. As an additional example, the instructions in the DSP can be performed by microcontroller or by digital hardware logic.

Figure 8:
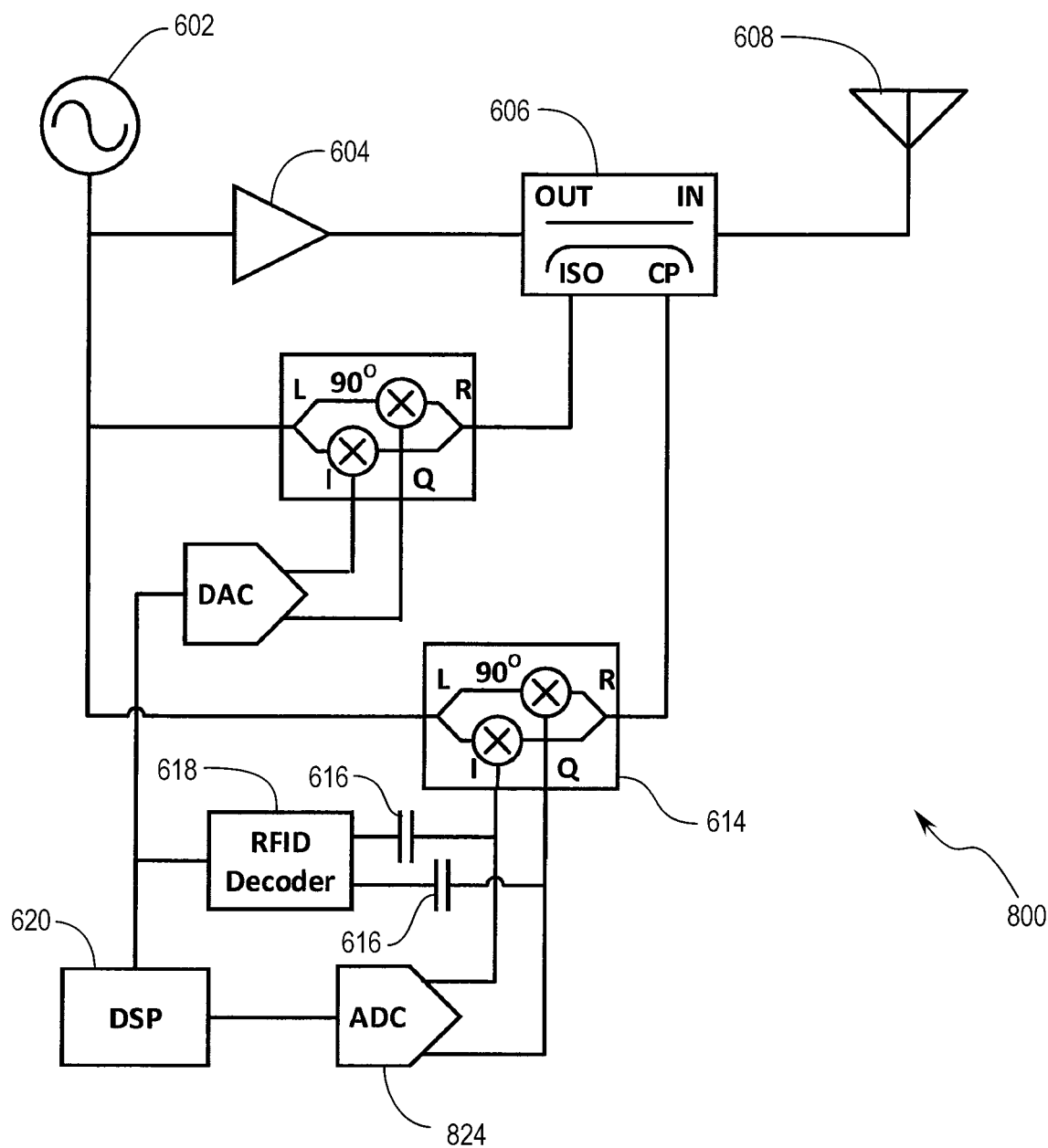
FIG. 8 is a system diagram of circuitry of an RFID reader that tracks object motion by tracking and canceling low frequency reflected signals using a dual channel ADC, according to an embodiment.

FIG. 8 is another embodiment of cancellation and tracking of low frequency oscillations. In this embodiment, the envelope detector 722 is eliminated and its function is replaced by a dual channel ADC 824 that is connected to the low frequency I and Q outputs of vector demodulator 614. In operation, the reflected RF signals created by moving objects enters the R port of vector demodulator 614, and dual channel ADC 824 has a low frequency or DC connection to the I and Q outputs of vector demodulator 614. ADC 824 provides a digital representation of the in-phase and quadrature-phase components of the reflected signal into DSP 610. As with FIG. 7, instructions in the DSP 620 create a cancellation signal that is output to DAC 726, converted to a RF cancellation signal by vector modulator 728, and combined coupler 606 to cancel the reflected RF signal.

Tracking of Low Frequency Oscillations

Two modes of operation systems in FIGS. 7, 8, and 9 are possible. The first mode is a high power mode using high power while scanning for RFID tags and also cancelling the low frequency oscillation signals.

The second mode is a low power mode which reduces power when in motion is detected to determine if a signal of an RFID tag is received. In this regard, the output from the RF circuitry is reduced and the RFID reader is more power efficient.

The systems in Figures can also operate in a high power mode for both scanning of RFID tags and cancelling low frequency operations.

Impedance Changing Compensation

The systems in FIGS. 7 and 8 describe use of an RF cancellation signal low frequency oscillations. In a similar manner, there may be impedance tracking and changing, which detects motion and then also maximizes antenna communications because the antenna is properly matches to the impendence seen by the antenna. This is described below.

Some RFID readers are equipped with antenna tuning circuits, called "auto-tuning," that are designed to compensate for the changes in impedance of the antenna over the frequency band of operation and for impedance changes caused by changes in the environment. The impedance of the antenna also changes with motion as object enter and leave the electromagnetic field. Tuning the antenna at a periodic rate and processing the tuning changes over time provides information about objects moving in the RF field.

This motion information could be used to provide advanced RFID reader features to differentiate RFID devices. Some features include a low-power motion detection mode that triggers RFID operations when objects enter the field, lowering the output power of a handheld reader when it is set down, gestures such as tapping the antenna or placing an object, like a plastic container, over the antenna to initiate the RFID operation.

There are two advantages with continually tracking the complex impedance of the antenna. First, when directly sampling the reflected energy dynamic range and measurement resolution become an issue since the impedance of the coupler circuit is fixed. With the traditional approach large impedance changes of the antenna result in larger reflected power that could saturate the detection circuitry. However, the method of tuning the reflected power to a minimum, as disclosed herein, requires less dynamic range in the detection circuitry since the reflected power is always minimized as the tuning circuit actively follows the impedance changes. Since the method, as disclosed herein, continually tunes to minimize the reflected energy the detection of antenna impedance changes is capable over a broader impedance range.

Another benefit of measuring changes in the antenna impedance this way is the ability to add gain or attenuation stages to the receive path without distortion to the reflected signal. Since the power going to the receive path is continually being minimized additional gain or attenuation can be used in the receive path to increase/decrease the sensitivity to antenna impedance changes.

Analyzing changes in complex impedance required to compensate for antenna impedance changes allows for the capability to determine relative motion information such as a person/object moving toward the antenna or moving away from the antenna. This becomes similar to monitoring the phase difference of arrival of the backscattered signal from an RFID tag, but in this case no tag is required. Also, since there is a relationship between the change of antenna impedance and the wavelength of the RF carrier wave relative distance of travel and relative speed information can be derived. This motion information could also be passed to other equipment to be used as a trigger such as cameras, imagers, and scanners.

One advantage of the antenna tuning circuit is the ability to compensate for the changing impedance of the antenna across the frequency band of operation. The tuning circuit of the reader has two controls, which can be adjusted to adjust the real and imaginary complex impedance of the coupler in order to minimize the reverse power. The RFID reader periodically executes the tuning algorithm that adjusts the magnitude and phase controls in order to minimize the amount of power reflected back into the receiver. The tuning circuit maximizes the cancellation of transmitted carrier wave signal that is reflected back into the radio receive circuitry.

Figure 11:
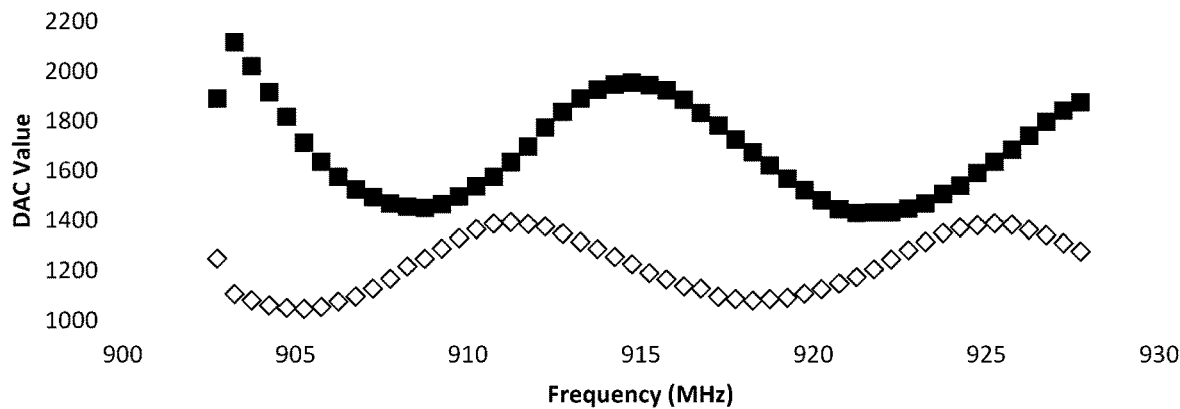
FIG. 11 is a graph showing real and imaginary components of complex RF tuning signals represented by DAC values over frequency, according to an embodiment.

As shown in FIG. 11, plotting the tuning or cancellation controls in Cartesian coordinates gives a better view of how the complex impedance changes of the tuning circuit change across frequency. As the frequency changes the impedance of the antenna at the given frequency changes and the tuning control values change. For typical antennas the tuning values move around in a circle or spiral.

Figure 12:
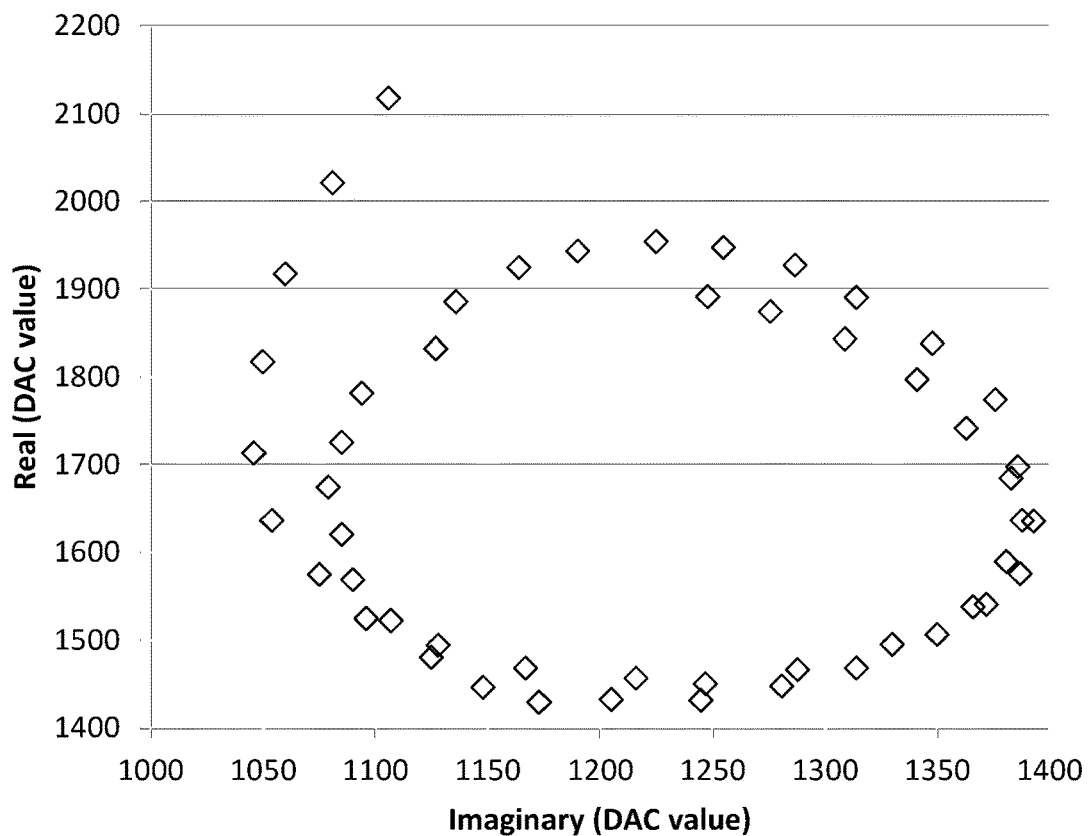
FIG. 12 is a graph showing real versus imaginary components of the DAC values over frequency, according to an embodiment.

As shown in FIG. 12, tuning across the frequency band is repeatable provided there are no changes in the field affecting the antenna impedance. The antenna impedance also changes when there are changes in the medium in which the electromagnetic waves propagate. Environmental changes and the motion of objects in the electromagnetic field also affect the impedance of the medium of wave propagation which can be seen at the antenna port. Motion of objects in the field changes the impedance at the antenna which in turn changes the antenna tuning values. Reading and processing the tuning values at a periodic rate with the reader on a single frequency allows for the detection of the motion of objects in the RF field of view.

Figure 13:
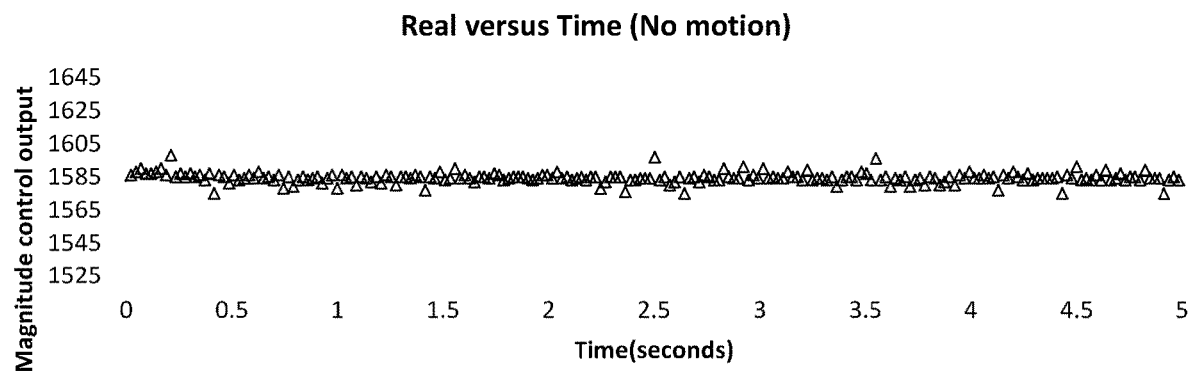
FIG. 13 is a graph showing real component of the DAC control output over time with no motion, according to an embodiment.
Figure 14:
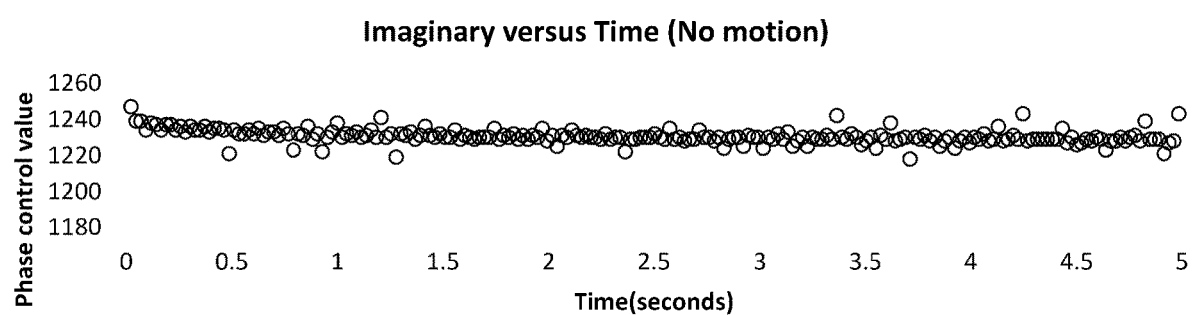
FIG. 14 is a graph showing imaginary component of the DAC control output over time with no motion, according to an embodiment.

The real and imaginary tuning values can be processed to determine when there are objects moving in front of the antenna. First, as shown in FIGS. 13 and 14 a baseline was recorded when there were no moving objects in front of the antenna to determine how much the tuning control values vary in this static case. Since the tuning algorithm tries to minimize the measured reverse power there is some variation in the tuning control values for the static case.

Figure 15:
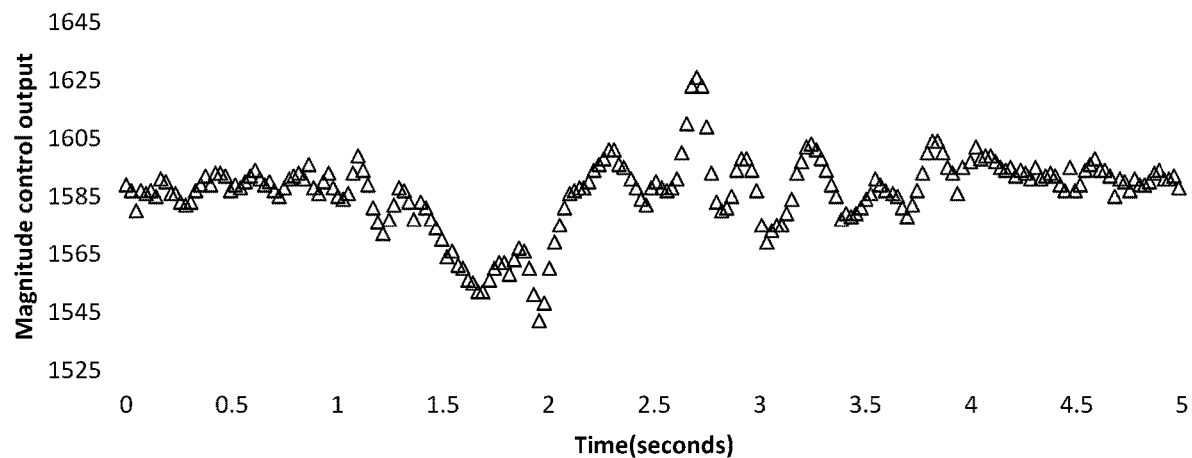
FIG. 15 is a graph showing real component of the DAC control output over time with motion, according to an embodiment.
Figure 16:
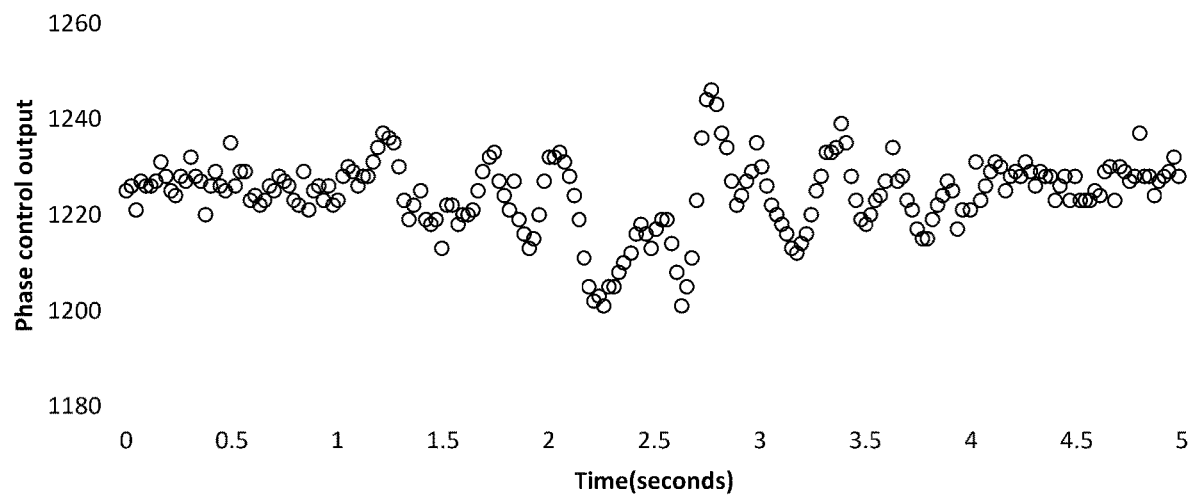
FIG. 16 is a graph showing imaginary of the DAC control output over time with motion, according to an embodiment.

FIGS. 15-16 show the real and imaginary tuning values when there is motion such as an individual walking. When objects are moving in the RF field, the real and imaginary tuning controls must change in order to compensate.

Processing the control value changes in this way can produce an output when there is a field disturbance that exceeds the threshold of the baseline when there are no disturbances in the field. Additional relative motion information can be acquired by processing the vector created by successive tuning locations. As objects move toward and away from the antenna the antenna impedance changes and the tuning circuit adjusts the complex vector around in a circle, or spiral, in order to compensate for the motion. Processing the rotation of the tuning values provides relative motion information.

Regarding relative motion, since the tuning controls are complex, the real and imaginary controls rotate around in a circle in response to complex impedance changes of the antenna. An easy way to visualize the movement around the circle is to use the vector created by two adjacent tuning values. This vector will have a magnitude representing how large of a change there was between the two points and an angle that represents the direction of rotation. Processing the magnitude and angle of the changes with respect to time can be used to determine when large impedance changes are happening and thus when objects are moving.

Figure 17:
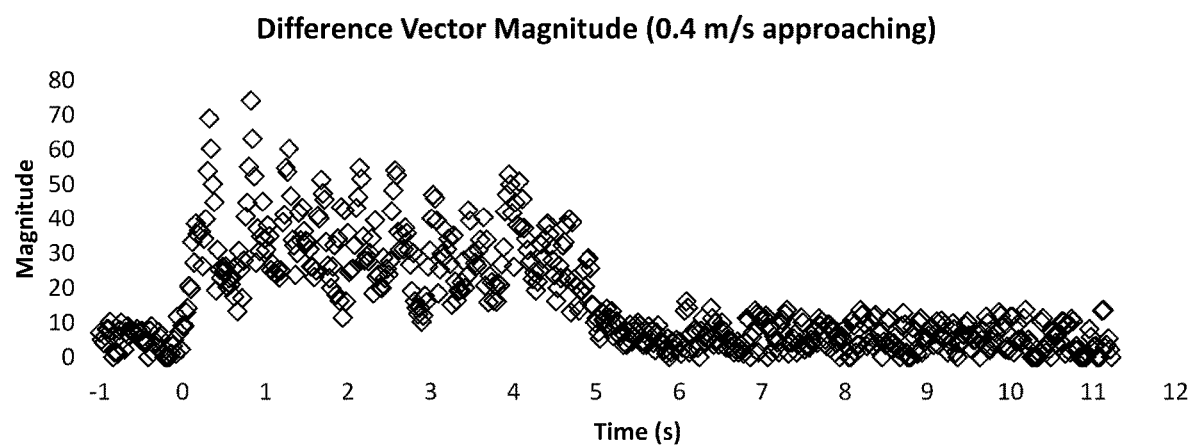
FIG. 17 is a graph showing the differences in magnitudes from adjacent complex values over time at a first approaching speed, according to an embodiment.
Figure 18:
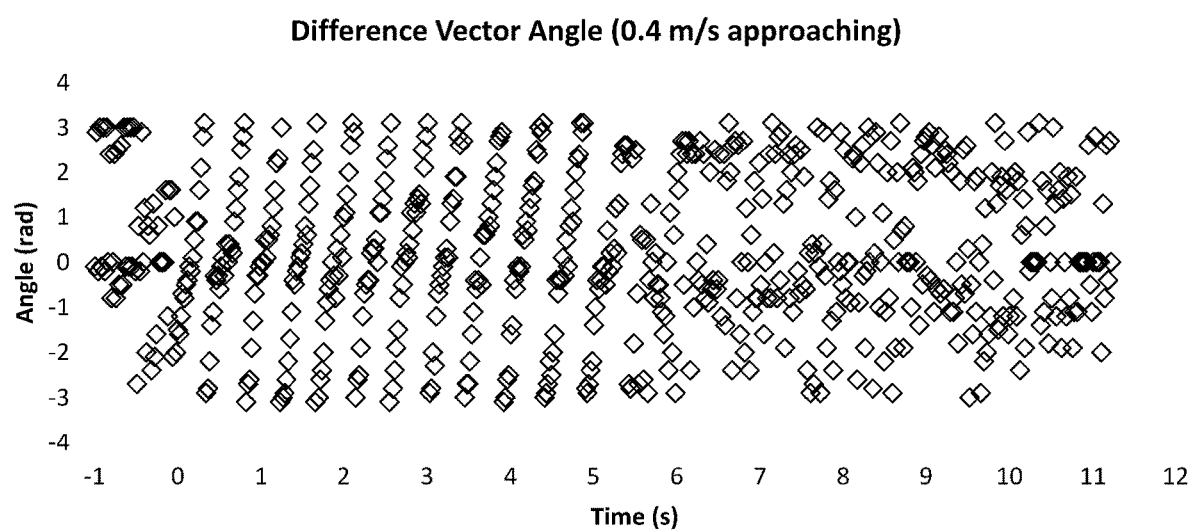
FIG. 18 is a graph showing the differences in angles from adjacent complex values over time at the first approaching speed, according to an embodiment.

When the distance between an object and the antenna decreases the antenna the tuning values rotate clockwise in order to compensate. The graphs shown in FIGS. 17 and 18 show first the magnitude of the vector difference and then the angle of the vector difference over time for an object that starts around eight feet from the antenna and then travels to within a foot of the antenna and comes to rest. The clockwise rotation can be seen by the wrapping of the angle vector that occurs between approximately two and seven seconds. Instructions in DSP 620 or suitable processing can detect the orderly fashion of wrapped phase to detect object motion.

Figure 19:
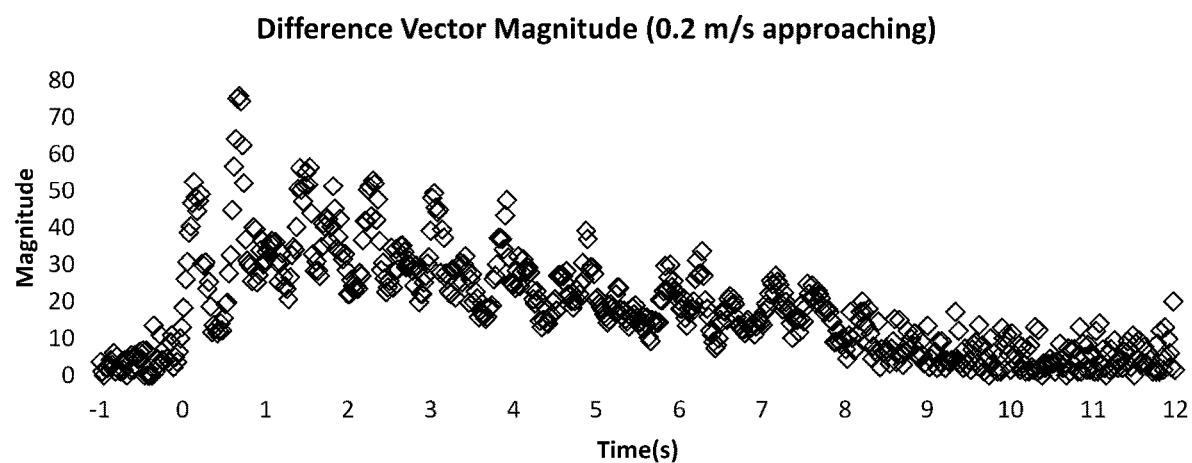
FIG. 19 is a graph showing the differences in magnitudes over time at a second approaching speed, according to an embodiment.
Figure 20:
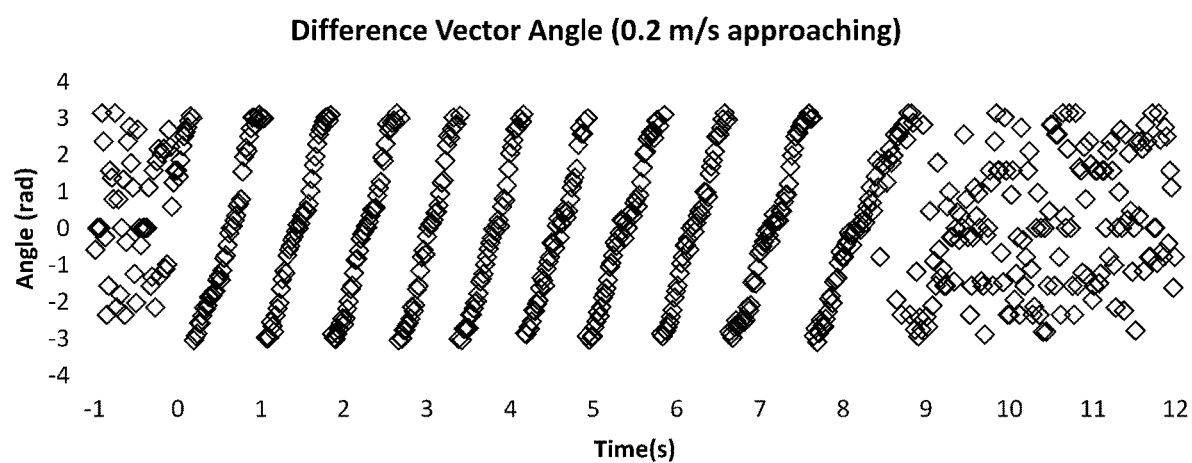
FIG. 20 is a graph showing the differences in angles over time at the second approaching speed, according to an embodiment.

In FIGS. 19-20, the same object then traveled in a similar path toward the antenna but at half the speed. The sampling rate of the tuning control changes is the same for both speeds. Slower moving objects have less sample to sample change which makes the magnitude of the change.

Figure 21:
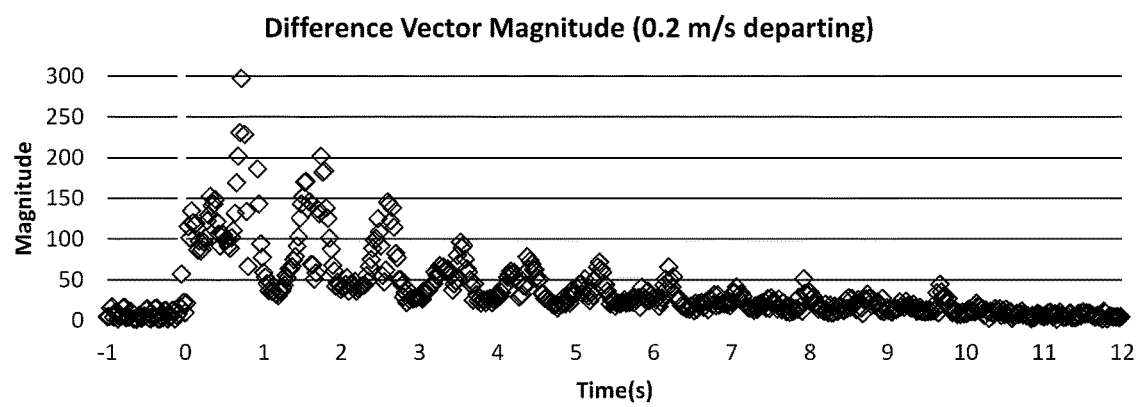
FIG. 21 is a graph showing the differences in magnitudes over time at a departing speed, according to an embodiment.
Figure 22:
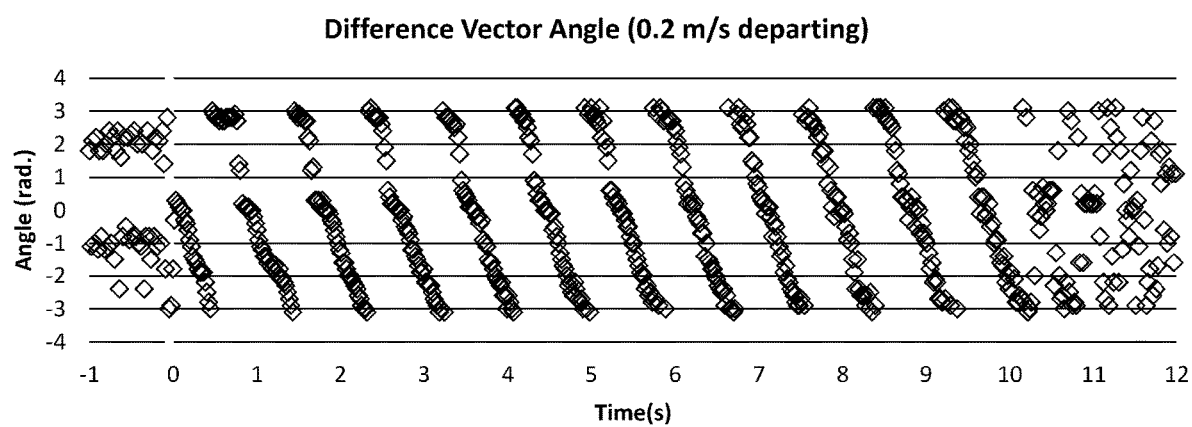
FIG. 22 is a graph showing the difference in angles over time at the departing speed, according to an embodiment.

FIGS. 21-22 show graphs when the motion is departing as opposed to arriving. When the distance between the antenna and the object increases the rotation of the tuning control values is counter clockwise. Note instructions in DSP 620 could use the ascending or descending angle to determine if the object is approaching or departing.

These and other changes can be made to the invention in light of the above Detailed Description. While the above description describes certain examples, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

In light of the above, the low frequency oscillations may be determined based on having a continuous signal reflected to the antenna (and received by the antenna). This strong continuous signal is detected (as discussed above). Tuning then occurs to continually achieve a local minimum in the detection circuit, and this has several advantages. First, the strong continuous signal reflections from the antenna are tuned out (as discussed above using, for example the cancellation signal(s)) allowing for high receive gain. This high gain coupled with relatively high forward power allows a very small low frequency signal change to result in a detectable condition. A large low frequency signal change is easily measured as well by increasing the receive attenuation or reducing the receive gain. The bypassable amplifier U3 in FIG. 10c may be used to attain this goal. This feature allows both exceptional sensitivity and high dynamic range, even at an antenna's band edges.

While certain aspects of the invention are presented below in certain claim forms, the applicant contemplates the various aspects of the invention in any number of claim forms.

The flowcharts and block diagrams in the Figures illustrate the architecture, functionality, and operation of possible implementations of systems and methods according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to embodiments of the invention in the form disclosed. Many modifications and variations will be apparent to those of ordinary skill in the art without departing from the scope and spirit of embodiments. The embodiment was chosen and described in order to explain the principles of embodiments and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments have other applications in other environments. This application is intended to cover any adaptations or variations of the present invention. The following claims are in no way intended to limit the scope of embodiments of the invention to the specific embodiments described herein.

What is claimed is:

1. An RFID reader comprising:
   a radio frequency (RF) circuitry;
   an antenna;
   a transmission pathway connecting the antenna with the RF circuitry;
   a coupler comprising: a main line in electrical communication with the transmission pathway, and a coupled line configured to sample signals received from the antenna, the sampled signals including low frequency oscillations caused by movement of an object or a body portion relative to the antenna, wherein the movement of the object or the body portion relative to the antenna is detected by detecting a change in complex impedance of the antenna; and
   a controller configured to output, using a signal generator, a cancellation signal, which is an inverse of the low frequency oscillations, to the coupler such that the cancellation signal from the controller is configured to cancel, at the main line, the low frequency oscillations received from the antenna.

2. The RFID reader of claim 1, further comprising an RF signal source configured to provide RF signals at frequencies above 850 MHz.

3. The RFID reader of claim 1, further comprising an RF signal source configured to provide RF signals at frequencies between 2.4 GHz and 2.483 GHz.

4. The RFID reader of claim 1, further comprising a filter attached to the coupled line for filtering the low frequency oscillations caused by the presence of the object or the body portion, wherein the low frequency oscillations are provided to the controller which provides the cancellation signal to the coupler to cancel the low frequency oscillations.

5. The RFID reader of claim 1, further comprising an RF signal source configured to provide RF signals of a power not exceeding approximately 10 mW.

6. The RFID reader of claim 1, wherein the controller is further configured to adjust one or more criteria by which a state signal is determined.

7. The RFID reader of claim 1, further comprising an Analog to Digital Converter (ADC) for converting an output signal to a digital value, and wherein the controller receives the digital value of the output signal.

8. The RFID reader of claim 1, further comprising a Digital to Analog Converter (DAC) to receive the cancellation signal from the controller, wherein an output of the DAC is output to the coupled line of the coupler.

9. The RFID reader of claim 1, wherein the low frequency oscillations are caused by changes in antenna and transmission line impedance matching.

10. The RFID reader of claim 1, further comprising a variable impedance at an isolation port of the coupler, the controller being configured to change an amount of power reflected by changing the variable impedance.

11. An RFID reader comprising:
a antenna that receives signals reflected from an object moving relative to the antenna configured to change complex impedance in response to outputting an output signal; and
circuitry configured to receive the reflected signals from the antenna and determine that the motion has occurred relative to the antenna in response to detecting changes in the received reflected signals.

12. The RFID reader of claim 11, further comprising:
a coupler comprising a main line in electrical communication with transmission pathway and a coupled line, the coupled line configured to receive low frequency oscillations; and
a digital signal processor configured to determine that the signals received from the coupled line are oscillations that are below a predetermined frequency to qualify as the low frequency oscillations.

13. The RFID reader of claim 11, further comprising:
an Analog to Digital Converter (ADC) for converting a signal sampled from the coupler to a digital value, and wherein a digital signal processor receives the digital value of the converted signal; and
a Digital to Analog Converter (DAC) to receive an output signal from the digital signal processor, wherein an output of the DAC is output to a variable impedance on the isolated port of the coupler.

14. An RFID reader comprising:
a radio frequency (RF) signal source providing RF signals;
an antenna receiving low frequency oscillations caused by the presence of an object or a body portion relative to the antenna;
an RF circuit configured to receive;
a transmission pathway between the RF circuit and the antenna; and
a controller configured to output, using the RF signal source, a signal to the transmission pathway based on the low frequency oscillations such that the signal from the controller is configured to cancel, at the transmission pathway, at least a portion of the low frequency oscillations received from the antenna configured to change complex impedance when the object or the body portion move relative to the antenna.

15. The RFID reader of claim 14, wherein the RF signal source provides RF signals at frequencies above 850 MHz.

16. The RFID reader of claim 14, wherein the RF signal source provides RF signals at frequencies between 2.4 GHz and 2.483 GHz.

17. The RFID reader of claim 14, further comprising a filter attached to the coupled line for filtering the low frequency oscillations caused by the presence of the object or the body portion, wherein the low frequency oscillations are provided to the controller which provides cancellation signals to the coupler to cancel the low frequency oscillations.

18. The RFID reader of claim 14, wherein the RF signal source provides RF signals of a power not exceeding approximately 10 mW.

19. The RFID reader of claim 14, wherein the controller is further configured to adjust one or more criteria by which a state signal is determined.

20. The RFID reader of claim 14, further comprising an Analog to Digital Converter (ADC) for converting an output signal to a digital value, and wherein the controller receives the digital value of the output signal.

* * * * *